US006732448B2

(12) United States Patent
Strzala (10) Patent No.: US 6,732,448 B2
(45) Date of Patent: May 11, 2004

(54) DEVICE FOR PREPARING TRANSFORMERS (75) Inventor: Helmut Strzala, Braunfels-Bonbaden (DE)

(73) Assignee: Wilhelm Hedrich Vakuumanlagen GmbH & Co. KG, Ehringshausen-Katzenfurt (DE)

( * ) Notice: Subject to any disclaimer, the term of this patent is extended or adjusted under 35 U.S.C. 154(b) by 0 days.

(21) Appl. No.: 10/110,788

(22) PCT Filed: Aug. 30, 2001

(86) PCT No.: PCT/EP01/10007
§ 371 (c)(1),
(2), (4) Date: Apr. 30, 2002

(87) PCT Pub. No.: WO02/20113
PCT Pub. Date: Mar. 14, 2002

(65) Prior Publication Data
US 2002/0184784 A1 Dec. 12, 2002

(30) Foreign Application Priority Data
Sep. 5, 2000 (DE) .......................... 100 43 993

(51) Int. Cl.⁷ .................................. F26B 13/30
(52) U.S. Cl. .................................. 34/92; 34/73
(58) Field of Search ..................... 34/72–78, 92, 34/119, 124; 219/600, 660, 670; 29/592.1, 602.1, 605; 174/8; 336/180, 182, 183

(56) References Cited

U.S. PATENT DOCUMENTS

| | | | |
|---|---|---|---|
| 3,373,500 A | * 3/1968 | Winter | 34/246 |
| 3,903,611 A | * 9/1975 | Kusay | 34/409 |
| 4,141,373 A | * 2/1979 | Kartanson et al. | 75/403 |
| 4,424,633 A | 1/1984 | Bernhardt et al. | |
| 4,430,208 A | * 2/1984 | Pytlewski et al. | 208/262.5 |
| 4,685,972 A | * 8/1987 | Fowler | 134/12 |
| 4,699,667 A | * 10/1987 | Walsh | 588/209 |
| 4,879,004 A | 11/1989 | Oesch et al. | |
| 5,424,513 A | * 6/1995 | Gmeiner et al. | 219/492 |
| 6,108,927 A | * 8/2000 | Strzala | 34/73 |
| 6,457,259 B1 | * 10/2002 | Bilofsky et al. | 34/467 |
| 2002/0174563 A1 | * 11/2002 | Gmeiner et al. | 34/343 |
| 2002/0178604 A1 | * 12/2002 | Gmeiner et al. | 34/77 |

FOREIGN PATENT DOCUMENTS

| | | |
|---|---|---|
| DE | 4446204 C1 | 2/1996 |
| DE | 19637313 A1 | 3/1997 |
| DE | 19826682 | 4/1999 |

* cited by examiner

*Primary Examiner*—Henry Bennett
*Assistant Examiner*—Camtu Nguyen
(74) *Attorney, Agent, or Firm*—Charles P. Boukus, Jr.

(57) ABSTRACT

The invention relates to a device including a vessel, a vacuum pump (10), at least one condenser (3 and/or 8) and a heat exchanger (16) for heating and drying parts (2) with cellulose or plastic based hygroscopic insulation in transformers, condensers, instrument transformers or electric leadthroughs by means of condensation heat from the steam of a heating fluid (a solvent, kerosine). During heating, at least one higher-boiling second liquid, such as transformer oil, is removed. In order to provide a mobile system enabling local treatment of transformers (2) which are already in operation, the heat exchanger (16) heats the heating fluid in the liquid phase and evaporation occurs near to or in the vessel, for example, via expansion valves (18) and/or in an expansion container or evaporator arranged directly on the vessel.

14 Claims, 7 Drawing Sheets

DEVICE FOR PREPARING TRANSFORMERS

BACKGROUND OF THE INVENTION

The invention relates to a device for heating and drying parts with cellulose or plastic based hygroscopic electric insulation, such as contained in transformers, condensers, electric lead through terminals, etc.

To avoid failures, power transformers in substations in the electrical energy supply grid require preventive preparations of their hygroscopic insulations. This is also true after repairs or if malfunctions have occurred, if after the apparatuses have been opened the hygroscopic insulations of the transformers have absorbed moisture and gas from the ambient air, reducing their insulating properties. Deposits of aging products also adversely affect the insulating capability.

In maintenance or in the event of minor malfunctions, the active part of the transformer can stay in the housing and be re-prepared locally, that is, in the substation, for further use. Several methods already exist for accomplishing this.

Preparation by means of the insulating oil is a widely used method. In it, the operating oil is drawn from the transformer by a recirculating process, carried in a closed loop through a vacuum preparation system, demoistened and degassed in the process, and returned to the transformer. By the contact of the dried oil with the insulation, a withdrawal of moisture from the insulation thus takes place indirectly via the preparation system.

In a further process, known as the "oil spray process", oil is for the most part drained out of the transformer, so that the insulations can be exposed to the vacuum. By spraying insulating oil into the interior of the transformer, the transformer is heated, and the evaporating moisture is aspirated by a vacuum pump connected to it.

Combinations of the aforementioned processes also exist in conjunction with recirculated hot air or partial direct heating of the windings by passing an electrical current through them.

All the above methods, however, have the disadvantage that the temperature range for the drying is very severely limited by the presence and use of the insulating oil. The impregnation also severely impairs the diffusion of water vapor. The preparation process is therefore extremely time-consuming. A further disadvantage is that the insulation is inadequately heated at places that are unfavorable in terms of flow and especially in poorly accessible conduits is not cleaned of the deposits.

In the event of major defects, the transformer must therefore be transported away from the distributor station to a repair facility, where it is broken down, repaired, and then re-prepared as described above.

Nowadays the insulations of power transformers, and especially the windings assembled to make the active part, are typically dried, upon initial production, at the producing factory by so-called vapor-phase processes in accordance with German Patent Disclosures DE 198 26 682 A1, DE 196 37 313 A1, or German Patent DE 44 46 204 C1. In these processes, the active part with the insulator parts contained in it is heated in a large vacuum autoclave with the solvent vapor, produced in an evaporator, and in the process subjected to intensive cleaning.

These methods are extremely effective, but they are poorly suited to on-site preparation of transformers that are already in operation, since the large cross sections toward the transformer that are required for delivering the heat transfer medium in vapor form cannot be achieved in a portable drying device.

SUMMARY OF THE INVENTION

With this as the point of departure, it is the object of the invention to overcome the aforementioned disadvantages and to prepare transformers, especially on-site, and in the process subject them to an intensive washing process. In this process, the absorbed oil should preferably also be precipitated out.

Since with the invention as many of the advantages named in the three references cited above are to be attained or preserved, the teaching in these references is hereby explicitly fully incorporated by reference.

According to the invention, a heat exchanger heats the heating fluid in such a way that it stays in the liquid phase. The evaporation does not take place until on or in the vessel, for example via expansion valves, or in an expansion container disposed directly on the vessel, via the pressure drop that takes place there, or via a separate evaporator.

The device can be either stationary or mobile, in which case the transformer housing of the transformer to be heated can be used as the vessel. It is favorable if the connections between the heat exchanger that heats the heating fluid and the expansion valves and/or between an outlet valve from the transformer housing and a feed pump of the system and/or between the transformer housing and one or more blocking valves are disconnectable. Then the system can easily be transported to its applicable locations of use and connected there.

If a removable solvent container is used for the heating fluid, then used heating fluid, whose properties have been impaired by transformer oil, can be removed directly and prepared elsewhere, and new fluid can very easily be supplied to the transformer.

To improve the efficiency, the transformer housing can be heated in insulated fashion or externally by portable insulating means, such as insulating plates, insulating mats, wall elements, single- or double-walled supporting air tents, or by portable supplementary heaters; for mobile operation, air heaters are an attractive choice.

Instead of expansion valves, which expand the heating fluid into the transformer housing and cause it to evaporate there, an expansion container with a short line to the transformer housing can also be used to evaporate the heating fluid. This expansion container can have a return line for the unevaporated heating fluid. The critical path for the evaporated heating fluid thus once again remains short, as desired.

The expansion container can also be disposed on the transformer housing. Once again, a short line to the transformer housing for the evaporated heating fluid is important. If an inlet line to a condenser is provided, then once the heating is concluded, better distillation of the solvent portion off from the mixture is possible.

If the expansion container has a permeable double jacket, then the heated heating fluid, to cover the heat losses, can flow through the expansion container before being evaporated.

In one version of the invention, it is additionally possible, for separating the already-concentrated heating fluid flowing out of the expansion container, to provide a thin-film evaporator. If the thin-film evaporator has an inlet line to a condenser, then the vapor that occurs at reduced pressure can be delivered directly to the condenser.

In a further version, a lightweight, compact thin-film evaporator, such as a plate evaporator, can be secured directly to the transformer housing. Once again, short paths for the vapor are then attained.

In a further embodiment of the invention, it is provided that the already-concentrated proportion flowing out of the expansion container is delivered through a valve and a pressure barrier by gravity to a downstream thin-film evaporator for filtering off the rest of the solvent, and the vapor occurring when the pressure has been lowered is delivered through the valve directly to the condenser. In still another embodiment of the invention, it is provided that the pressure barrier is formed by a feed pump with a valve circuit, and the post-evaporator is set up inside the mobile system. It is attained as a result that in the preparatory phase the evaporator need not be secured to the transformer housing, which considerably reduces the manual effort required.

If the transformer is located so low that there is no space to hold the heating fluid flowing out of the vessel, then a feed pump, designed for low inlet heights, which is preferably embodied as a liquid ring pump or as a positive displacement pump, and an intermediate container, disposed at a higher level are used, with a downstream centrifugal ring pump for the further pumping of the heating fluid into the heat exchanger and/or into the evaporators. The intermediate container thus makes an adequate inlet height for the centrifugal pump possible.

For more-effective cleaning of the solvent at the end of the heating and after the conclusion of the pressure reduction, a thin-film evaporator, with an inlet line to a condenser and with an outlet line to the solvent container, can be provided.

Further objects, advantages, characteristics and possible uses of the present invention will become apparent from the ensuing description of the exemplary embodiments in conjunction with the drawings. All the characteristics described and/or shown in the drawings, on their own or in arbitrary useful combination, form the subject of the present invention, independently of how they are combined in the claims or of the claims dependency.

DETAILED DESCRIPTION OF THE INVENTION

Figure 1:
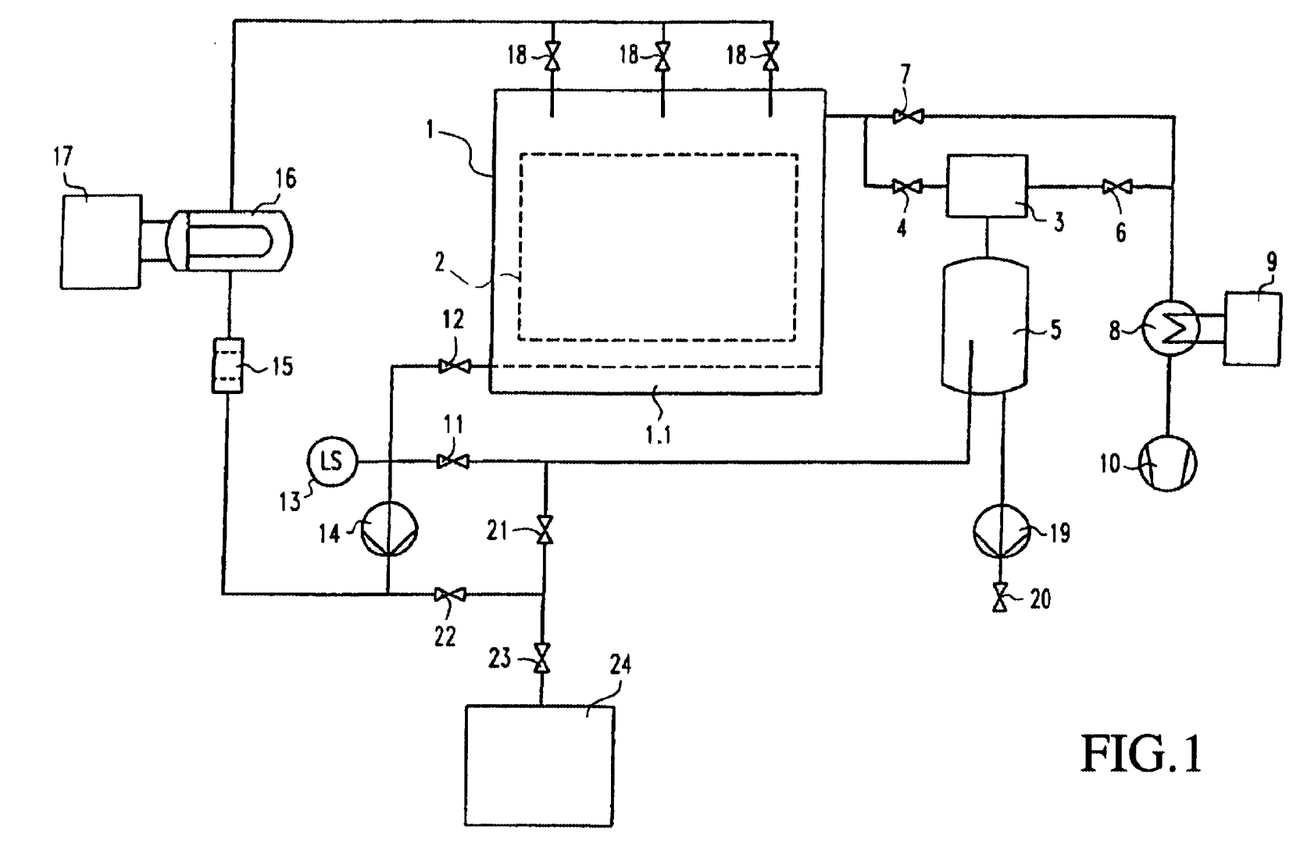
FIG. 1 is a diagram of an embodiment of a device according to the invention with direct evaporation in the transformer housing.

The device of FIG. 1 has a transformer housing 1, in which a part or parts to be treated, such as an active transformer 2, is located. The drying system of FIG. 1 is advantageously connected to the transformer housing 1 by flexible connecting lines. Two condensers 3 and 8 are connected via the valves 4, 6 and 7. The condenser 8 is cooled by the cooling system 9. A vacuum pump 10 is connected to it. The separation tank 5 is connected to the condenser 3. From the sump of the condenser 3, a line including a feed pump 19 leads to an outlet valve 20. From its middle region, a line leads via a valve 11 to the level sensor 13 and to a feed pump 14. The line also leads via valves 21 and 23 to a solvent container 24. From the transformer sump 1.1 of the housing 1, a line with a valve 12 also leads to the feed pump 14. A tie line with a valve 22 branches off between the valves 21 and 23 and leads to the outlet of the feed pump 14. From there, a line leads via the filter 15 to the heat exchanger 16 for the heating fluid. The heat exchanger 16 is heated by the heater 17. A line carries heated heating fluid to the expansion valves 18 provided on the 1.

In a mobile system, flexible, removable connections between the transformer 1 and the system are provided, for instance between the components 16 and 18, 12 and 14, and between 1 and 7 and 1 and 4.

The function of such a system, and the possible procedures there for heating, reducing pressure, and regenerating the fluid, have already been described at length with respect to stationary systems in the German references cited, DE 198 26 682 A1, DE 196 37 313 A1, and DE 44 46 204 C1.

As the heat transfer medium, as in the non-mobile vapor phase systems, a heating fluid which is a solvent, such as kerosene, is used. According to the invention, the solvent is heated in liquid form in the heat exchanger 16 and injected into the transformer housing 1 via the expansion valves 18. Upon entry into the transformer housing 1, which has been evacuated by the vacuum pump 10, some of the liquid solvent evaporates and transfers the condensation heat, from the ensuing condensation on the colder parts of the transformer 2, to these colder places and thus heats them up.

The unevaporated portion of the solvent, acting as a heat reservoir, flows together with the condensate via the insulation of the transformer 2 and thus contributes to the heating and simultaneously takes part in the cleaning process. Contaminants are carried out via the feed pump 14 and are filtered out of the loop in the filter 15.

Since the solvent is a good solvent, the oil adhering to and in the insulation is washed out to a maximum extent and dissolved in the solvent. The mixture is delivered to the feed pump 14 via the valve 12. By de-oiling the insulation and because of the absence of oxygen, the usual elevated temperatures for vapor phase processes can be employed. Because of the reduced proportion of oil, on the one hand a higher operating temperature is possible, and on the other, higher diffusion of water vapor is achieved.

By means of a suitable control device, the pump 14 is initially supplied with solvent from the solvent container 24 via the valves 21, 23 and 11. The condensate flowing out from the transformer and the unevaporated portion form an increasing buffer volume in the transformer sump 1.1 on the bottom of the transformer. Once the buffer volume in the transformer sump 1.1 is sufficient, the valve 12 is opened and the valve 21 is closed, creating a closed loop. In this way, the active transformer 2, located in its own housing 1, is heated to the requisite drying temperature. In the process, the radiator valves are closed. The transformer housing 1 can be protected from outside by a suitable heat insulation, to reduce heat losses.

The solvent quantity that must be made available in the complete drying and cleaning process is determined in accordance with the expected quantity of oil. For especially large transformers, provision is made for exchanging the container 24 with the used solvent (heat transfer medium) for a container with cleaned solvent during the process. To filter off the dissolved oil, the container with the contaminated solvent is either brought to a large vapor phase apparatus or connected to a solvent recovery system. In this way, the solvent can be continually re-used. The dissolved oil can, however, also be filtered off again in the system itself during intervals in the process, as will be described later herein.

Since the device has been conceived of preferably for mobile use, as a rule electrical energy is available for its operation. However, a heat exchanger heated with natural gas or heating oil is equally usable. The condenser 3 necessary for controlling the process is advantageously embodied as air-cooled.

To protect the vacuum pump or vacuum pump set 10, the condenser 8 is cooled by a cooling system 9.

The water vapor liberated in the process and the invading leaking air are aspirated into the condenser 3 via the automatic regulating device 4, in the form of a valve, with the aid of a small quantity of solvent vapor. Water vapor and solvent condense in the condenser and collect in the separating tank 5. The solvent flows back into the solvent loop and once again participates in the heating process in the heat exchanger 16. The water that has precipitated out is pumped out of the separating container 5 by the pump 19.

The further drying process takes place in the same way as in the large vapor phase systems in the three references cited above.

Along with mobile use of the above-described vapor phase system, however, the system can also be used as an economical, stationary device in conjunction with a vacuum drying boiler.

Figure 2:
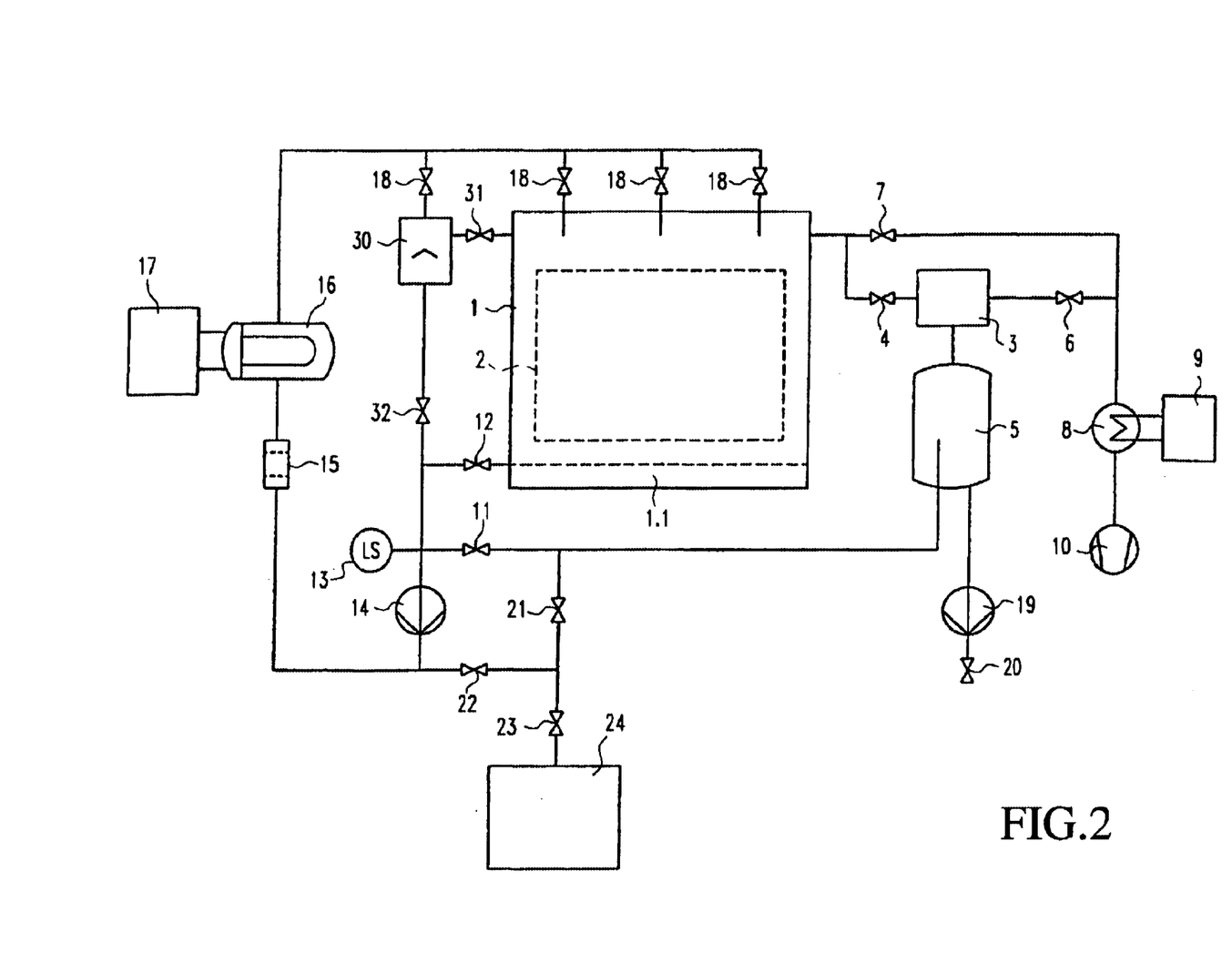
FIG. 2 is a diagram of a first embodiment according to the invention with expansion containers.

FIG. 2 shows a similar embodiment, which however has an expansion container 30, which is disposed near the transformer housing 1 and whose vapor chamber communicates with the transformer housing 1 via a short line, which has a valve 31. A line having an expansion valve 18 leads into the expansion container 30. From the sump of the expansion container 30, a line with a valve 32 leads to the feed pump 14. In this embodiment, the evaporation is accordingly performed in the expansion container 30, connected upstream of the transformer housing 1 and having an expansion valve 18. The vapor is delivered to the transformer housing 1 through the valve 31. The portion that does not evaporate and that acts as a heat reservoir is returned externally to the solvent loop through the valve 32. This has the advantage that after the heating process, or in intervals between heating, for instance during or after an intermediate pressure reduction, the absorbed oil can be filtered off again.

To that end, the expansion valves 18 on the transformer housing 1 are closed, and the expansion valve 18 on the expansion container 30 and the valves 31 and 32 are all opened. Some of the solvent vapor produced flows through the valve 31 into the transformer housing 1, where it gives up its condensation heat. The other, larger part reaches the condenser 3 and condenses there. The condensed, pure solvent, such as kerosene, flows into the separating tank 5 and is emptied as needed into the container 24.

In this way, the solvent and oil mixture in circulation is concentrated, until a residual concentration of solvent in oil that meets the temperature and pressure conditions in the transformer housing 1 and in the condenser 3. The oil, maximally concentrated, is pumped out into the solvent container 24.

Figure 3:
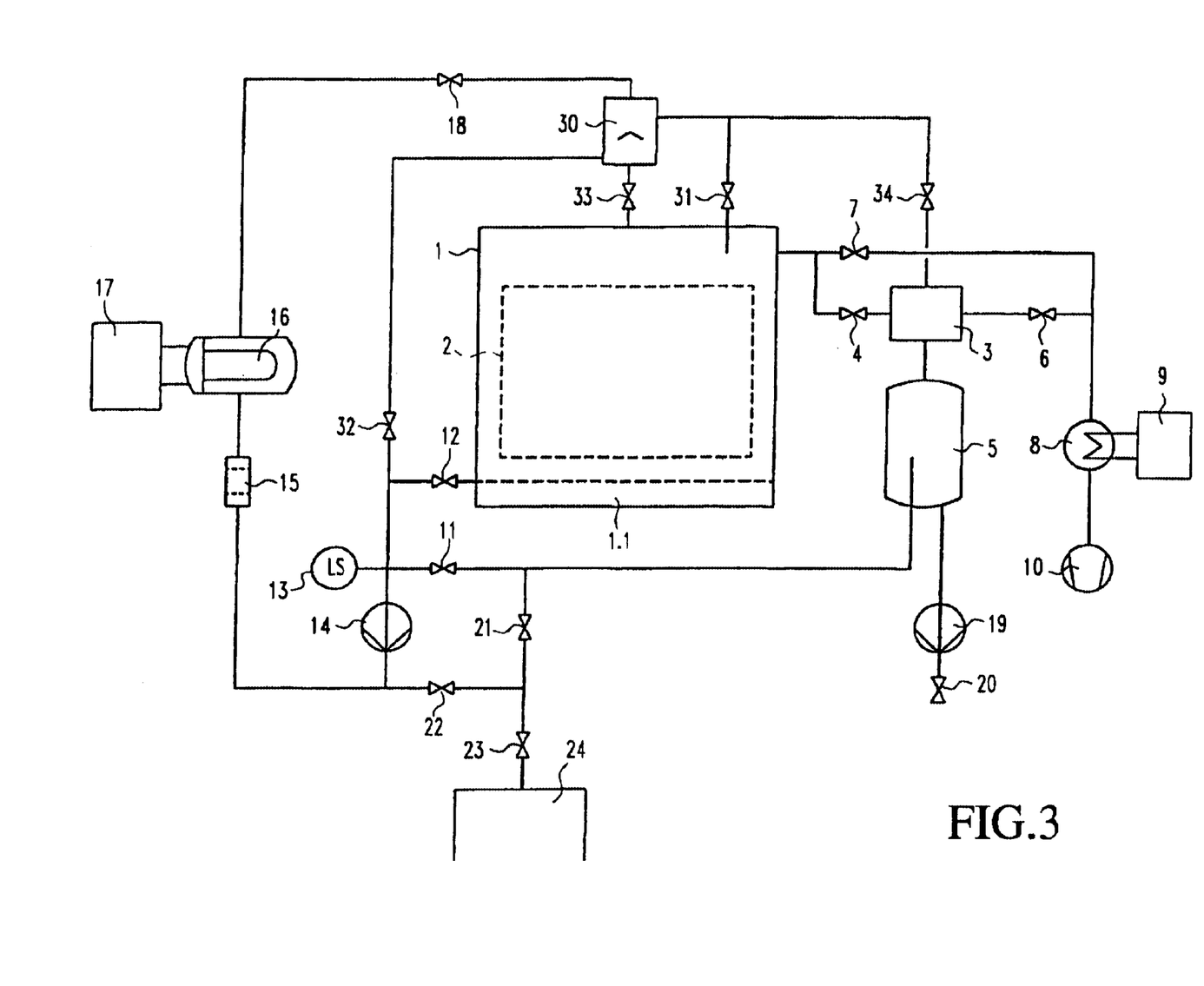
FIG. 3 is a diagram of a second embodiment according to the invention with expansion containers.

FIG. 3 shows another version, in which an expansion container 30, shown as in FIG. 2, is disposed at a different place, namely above the transformer housing 1. From its vapor chamber, a line with a valve 31 leads into the transformer housing 1 and via a valve 34 to the condenser 3. A line with a valve 33 also leads from the sump of the condenser 3 into the transformer housing 1.

To achieve even better distillation of the solvent portion off from the mixture, it is provided as shown in FIG. 3 that the expansion container 30 is mounted on the transformer housing 1. As a result, the transformer 2 can already be supplied during the heating with some of the solvent already in vapor form through a valve 31 and with another portion unevaporated through a valve 33, which serves the purpose of simultaneous improved rinsing of the transformer interior.

Once the heating has been concluded, the unevaporated return can be delivered to the solvent loop through a valve 32, while the vapor produced in the expansion container 30 can be delivered to the condenser 3 through the direct communication with the valve 34. Because of the markedly lower pressure, resulting from the direct communication with the condenser 3, in the vapor-carrying system (the expansion container 30 and the condenser 3), a markedly better concentration, with only small residual quantities of dissolved solvent, is possible.

Figure 4:
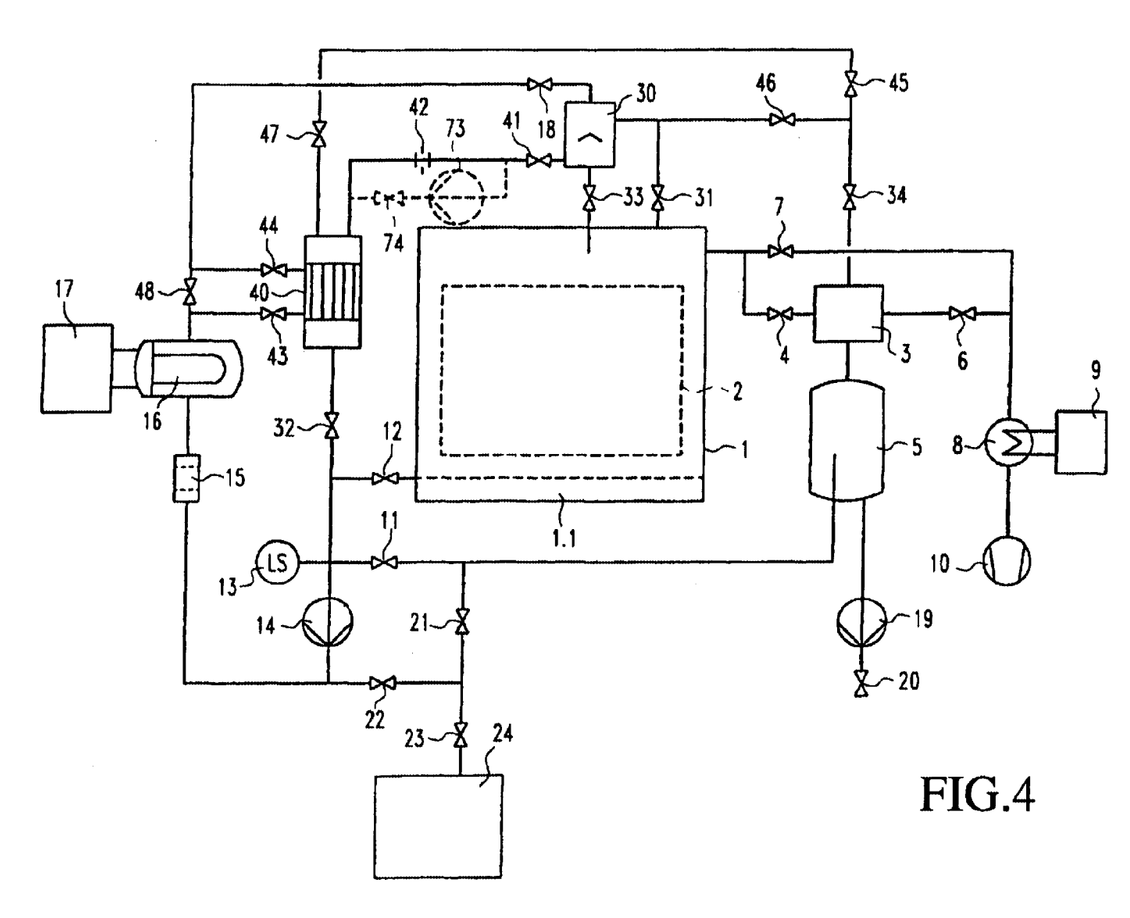
FIG. 4 is a diagram of an exemplary embodiment similar to FIGS. 2 and 3, but with an additional thin-film evaporator.

FIG. 4 shows a version that is similar to FIG. 3. In FIG. 4, a thin-film evaporator 40 is connected to the sump of the expansion container 30, via a valve 41 and a pressure barrier 42. The sump of the thin-film evaporator leads to a valve 32. From the head of the thin-film evaporator, a line with the valves 47 and 45 leads to a valve 34 upstream of the condenser 3, and a tie line between the valves 34 and 45 and having a valve 46 leads to the vapor chamber of the expansion container 30 or the vapor valve 31. For heating the thin-film evaporator 40, lines with valves 43 and 44 branch off from the hot part of the solvent loop. The flow rate can be controlled with a valve 48.

With the version of FIG. 4, a further improvement in the distillation properties is attained by providing that the already-concentrated mixture flowing out of the expansion container 30 is delivered not to the valve 33 but rather, via the valve 41 and the pressure barrier 42, to the downstream thin-film evaporator 40, which can be put into direct communication with the condenser 3 via the connecting line through the valves 47, 45 and 34. By recirculation of the solvent and oil mixture already contained both in the transformer sump 1.1 and in the solvent container 24, the solvent is filtered off from the mixture, except for the tiniest possible small residual amounts.

Still further improvement can also be attained if the thin-film evaporator 40 is heated by the incoming flow heated in the heat exchanger 16, by way of the valves 43 and 44.

Figure 7:
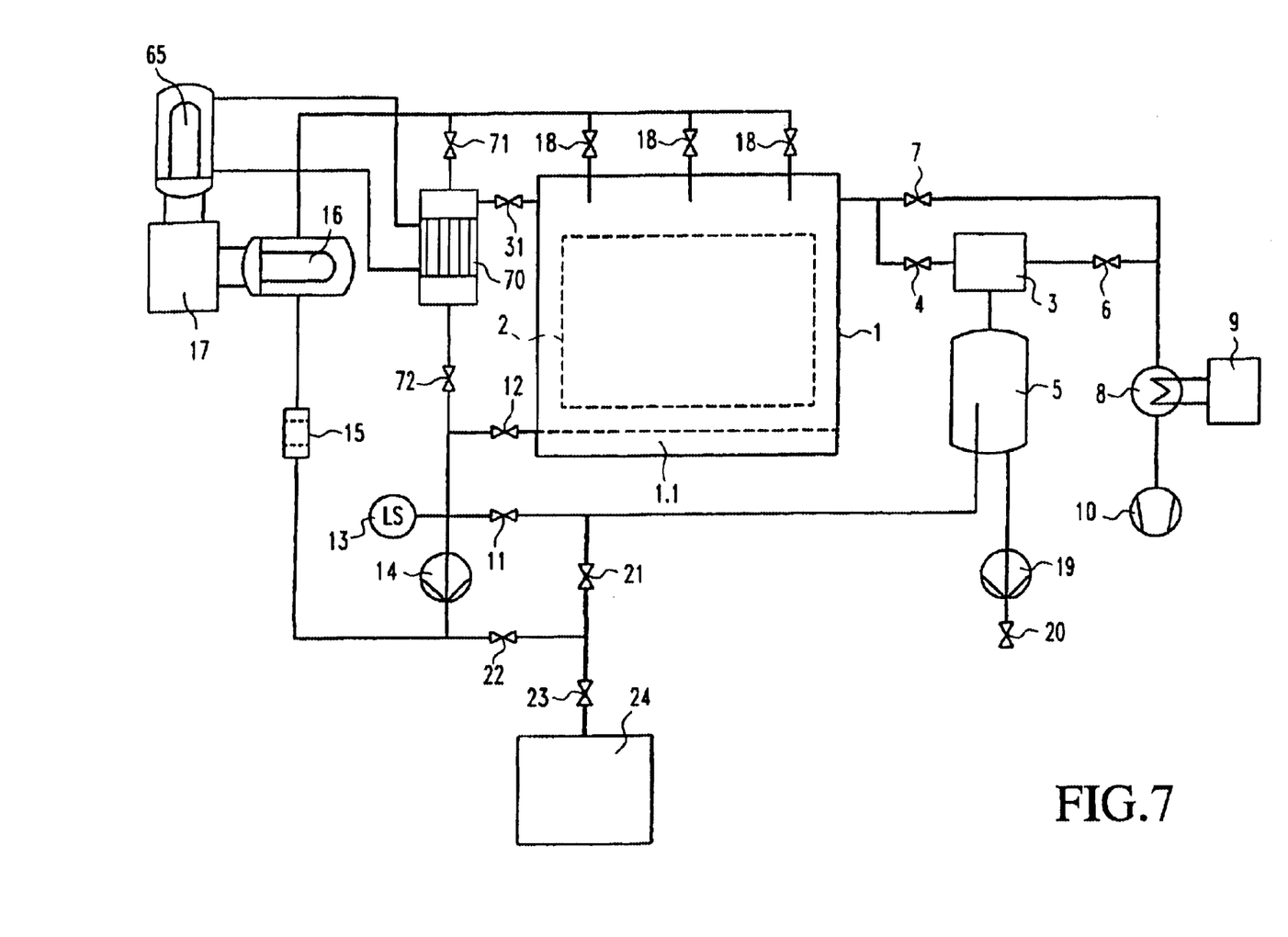
FIG. 7 is a diagram of a third version with a thin-film evaporator.

Further improvement is obtained if the thin-film evaporator 40 is heated by a second heater loop having a separate heat transfer fluid, as in FIG. 7.

Instead of the pressure barrier 42 acting by gravity, a feed pump 73 with a valve 74 can also be used. As a result, both the pump 73 and the thin-film evaporator 40 can be disposed in the mobile part of the system, which makes a substantial reduction in the effort and expense of preparing for the preparation process possible.

In many cases, it is impossible, or is possible only with major effort, to locate the feed pump 14 far enough below the transformer housing bottom to assure an adequate geodetic inflow height from the transformer housing 1, which is in a vacuum, for proper function of the pump 14.

Figure 5:
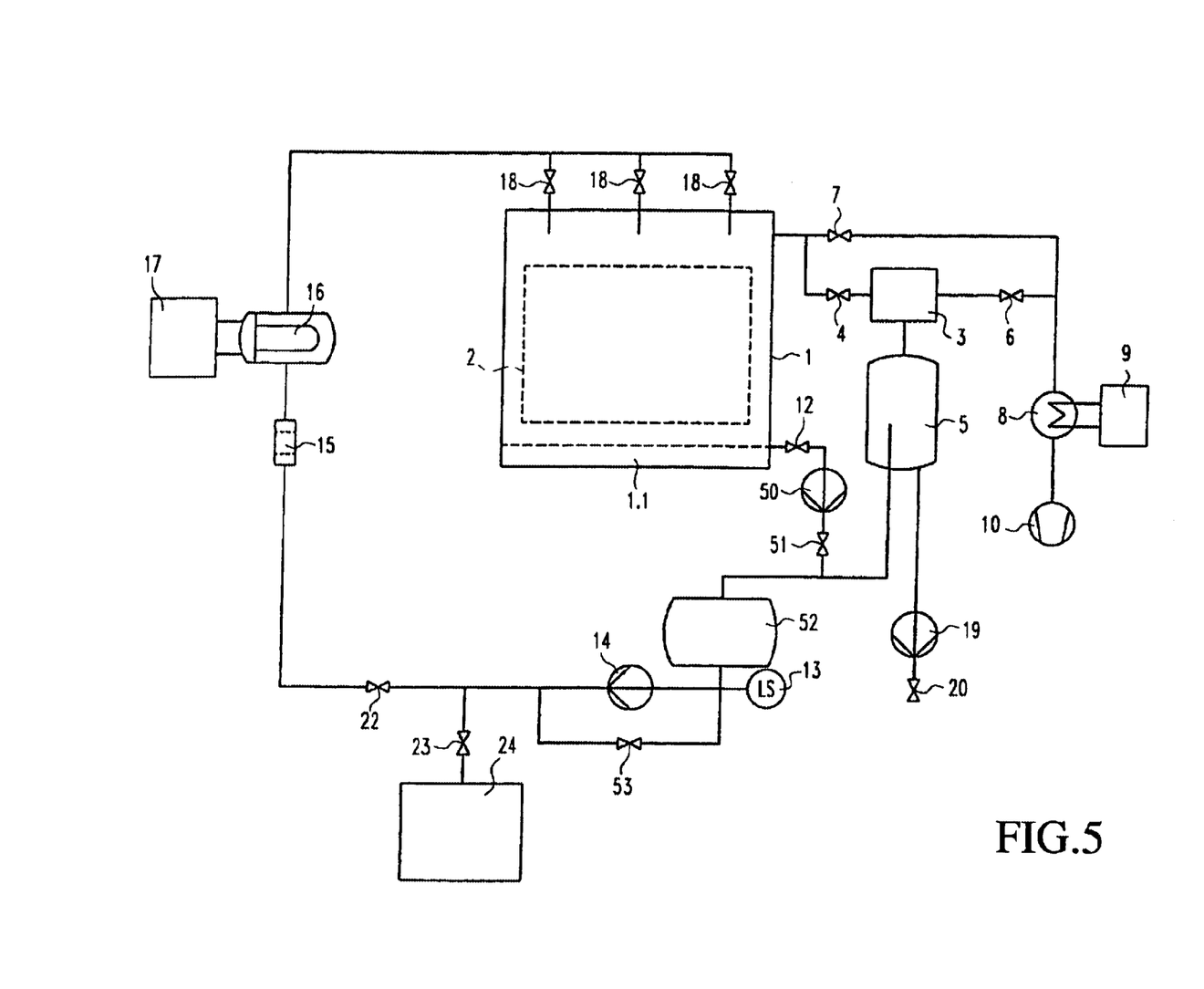
FIG. 5 is a diagram of an embodiment according to the invention with an intermediate container for the fluid.

The embodiment of FIG. 5 is quite similar to that of FIG. 1, but here, a feed pump 50 with a control valve 51 and a collection or intermediate container 52 are provided downstream of the outlet valve 12 of the transformer sump 1.1. From the sump of the collection container 52, a line leads to the feed pump 14. A bypass line with a valve 53 is also provided, which bypasses the feed pump 14.

In this respect it is favorable if the solvent flowing out of the transformer housing 1 through the valve 12 and optionally carrying oil with it is fed, by a lightweight, easily mounted feeding device, into a collection container 52 located at a higher level of the system. From there, with a type of centrifugal pump that has already proved itself for the process, it is returned to the expansion valves 18 again via a filter 15 and a heat exchanger 16. Known feed pumps, such as liquid ring vacuum pumps, reciprocating piston pumps, or diaphragm pumps can be employed, which are capable of pumping not only liquids and gases but also vapors as well as mixtures of these components without problems.

Figure 6:
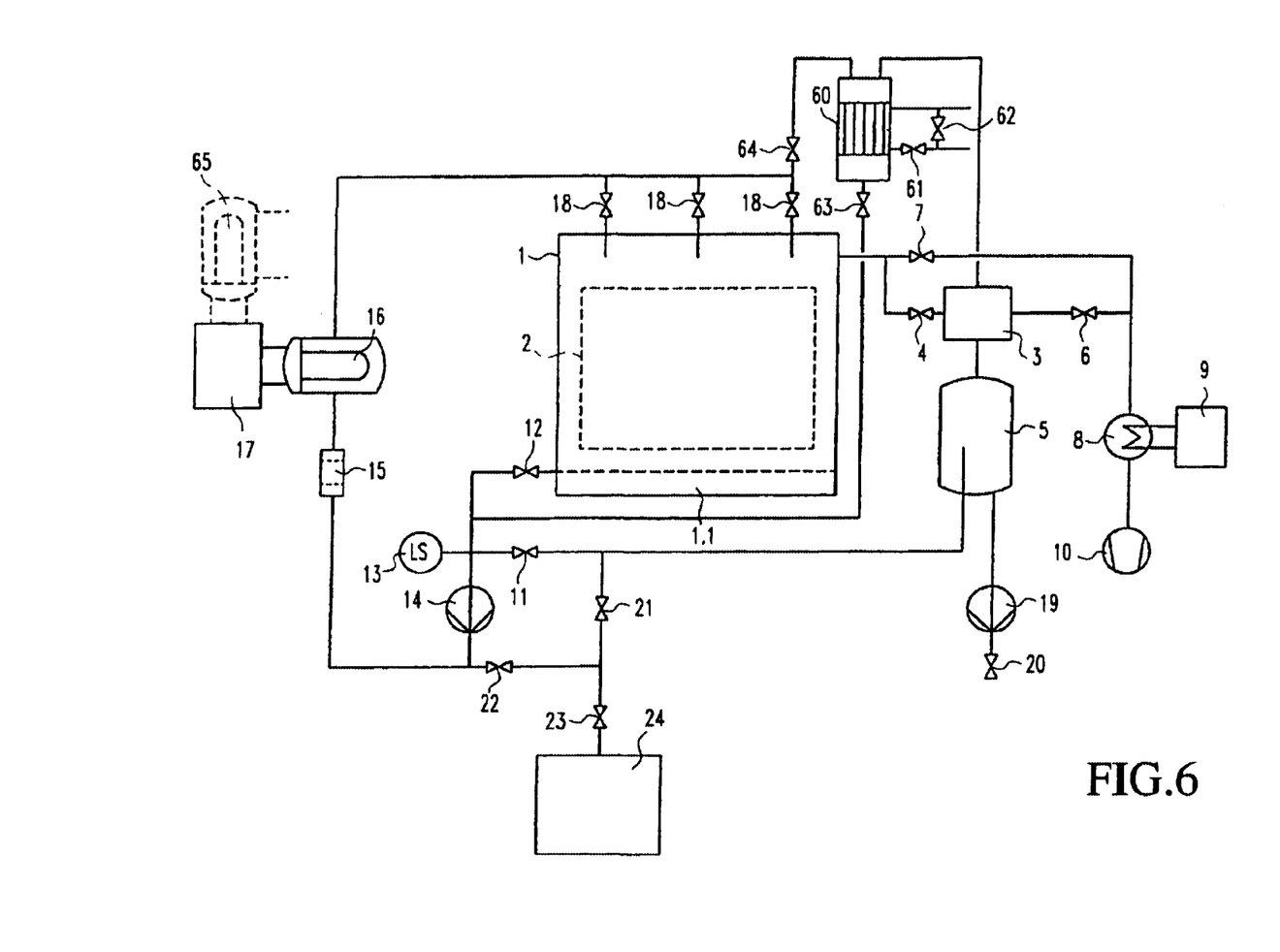
FIG. 6 is a diagram of a second version with a thin-film evaporator.

FIG. 6 shows a further version, in which an extremely effective variant for recovering the heat transfer medium solvent is provided. This variant again corresponds to that of FIG. 1, except that it additionally has a thin-film evaporator 60. The headroom of the thin-film evaporator communicates via the valve 64 with the hot part of the solvent loop. From its headroom, a line leads directly to the condenser 3, and from its sump, a line with the blocking valve 63 leads to the outlet 12 or to the feed pump 14. The valves 61 and 62 regulate the heating capacity of the thin-film evaporator 60; a second heat exchanger 65 (shown in dashed lines) can be disposed at the heater 17.

In this version, the solvent and oil mixture, after the end of heating in the transformer housing 1 and after the end of the concluding intermediate pressure reduction, can be delivered to the thin-film evaporator 60 for distillation, instead of to the expansion valves 18. This thin-film evaporator 60 can be accommodated in the mobile part of the system, so that no further flexible connections are required between the transformer housing 1 and the system, other than the connections already shown in the basic version of FIG. 1 between the components 16 and 18, 12 and 14, and between 1 and 7 and 1 and 4.

The heating is expediently accomplished through a separate heat transfer medium loop having the heat exchanger 65, which can be heated by the heater 17. The vapor produced in the thin-film evaporator 60 is delivered directly to the condenser 3. The oil filtered off is delivered to the container 24. It is advantageous that at little expense for preparation and installation, excellent results for recovery of the solvent and for filtering off the transformer oil are attained.

The variant of FIG. 7 is again similar to that of FIG. 1. In addition, however, a thin-film evaporator 70 in the solvent loop is provided, which can be activated via valves 71 and 72. From its head, a short line with a valve 31 leads into the transformer housing 1. It is heated by the heat exchanger 65 via two lines.

The variants described in conjunction with FIGS. 1–6 function essentially with expansion vaporization for heating the transformer housing 1. Only for filtering off the oil or recovering the solvent are direct-evaporating devices sometimes used. However, the version shown in FIG. 7 is also possible, in which a lightweight, compact thin-film evaporator 70 is disposed at or on the transformer housing 1. The evaporator can be embodied as a commercially available plate evaporator or similar device. It is supplied with both the solvent and separate heating energy in the form of liquid.

It is advantageous that here a larger quantity of the delivered solvent is evaporated directly, and lesser quantities have to be recirculated. The good heating and filtering results already known from German Patent 196 37 313 C2 are thus attained.

What is claimed is:

1. A device for heating and drying parts with cellulose- or plastic-based hygroscopic electric insulation in a vacuum by means of condensation heat of a vapor from a heating fluid, wherein during the heating of the parts, at least one second fluid, is removed from the parts, comprising a vessel for containing the parts, a vacuum pump for producing a vacuum in the vessel, at least one condenser for condensing vapor from the vessel, means for circulating the heating fluid through the vessel including a pump for pressurizing the heating fluid, a heat exchanger for the pressurized heating fluid, the heat exchanger heating the pressurized heating fluid, but leaving the pressurized heating fluid in the liquid phase, and expansion means for expanding at least a portion of the heated and pressurized heating fluid just prior to or in the vessel.

2. The device of claim 1 wherein the device excluding the vessel is embodied in mobile form, the parts to be heated is a transformer, and the vessel is a housing containing the transformer.

3. The device of claim 1 further including connections to the vessel which are disconnectable.

4. The device of claim 1, characterized by a removable container for the heating fluid.

5. The device of claim 1 further including portable insulating means and portable supplementary heaters.

6. The device of claim 1 wherein the expansion means includes an expansion container, a short line for feeding the heating fluid vapor from the expansion chamber to the vessel, and a return line for returning unevaporated heating fluid from the expansion container to the circulating means.

7. The device of claim 1 wherein the expansion means includes an expansion container, a short line for feeding heating fluid vapor from the expansion container to the vessel, two return lines for unevaporated heating fluid to the circulating means, and an inlet line to the at least one condenser.

8. The device of claim 6 wherein the expansion container has a permeable double jacket.

9. The device of claim 6 further including a pressure barrier a and a thin-film evaporator downstream in the return line for evaporating the unevaporated heating fluid and delivering the vapor from the thin-film evaporator to the condenser.

10. The device of claim 9 wherein the pressure barrier is formed by a feed pump with a valve circuit, and the device excluding the vessel but including the thin-film evaporator is a mobile system.

11. The device of claim 1 wherein the expansion means includes a drop-film evaporator or a plate evaporator heated from the heat exchanger.

12. The device of claim 1 further including a feed pump designed for low inlet heights and an intermediate container for the heating fluid flowing out of the vessel.

13. The device of claim 1 further including a thin-film evaporator with an inlet line to the condenser and with an outlet line to the return line, and a separate heat exchanger for heating the thin-film evaporator.

14. The device of claim 1 wherein the expansion means includes a lightweight, compact thin-film evaporator which is secured directly to the vessel and is supplied and heated with heating fluid from the heat exchanger.

* * * * *

UNITED STATES PATENT AND TRADEMARK OFFICE
CERTIFICATE OF CORRECTION

PATENT NO. : 6,732,448 B2
DATED : May 11, 2004
INVENTOR(S) : Helmut Strzala It is certified that error appears in the above-identified patent and that said Letters Patent is hereby corrected as shown below:

Column 8,
Line 13, after "fluid", delete ",".
Line 52, after "barrier", delete "a".

Signed and Sealed this

Tenth Day of August, 2004

JON W. DUDAS
*Acting Director of the United States Patent and Trademark Office*